(12) United States Patent
Boisset et al.

(10) Patent No.: US 11,659,306 B2
(45) Date of Patent: May 23, 2023

(54) METHOD FOR COMMUNICATION BETWEEN A PLURALITY OF WHEEL UNITS WITH ONE ANOTHER AND WITH A REMOTE MONITORING AND/OR CONTROL DEVICE

(71) Applicants: Continental Automotive France, Toulouse (FR); Continental Automotive GmbH, Hannover (DE)

(72) Inventors: Jean-Philippe Boisset, Montauban (FR); Jean-Charles Huard, Toulouse (FR); Nicolas Guinart, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 120 days.

(21) Appl. No.: 16/959,818

(22) PCT Filed: Jan. 22, 2019

(86) PCT No.: PCT/FR2019/050131
§ 371 (c)(1),
(2) Date: Jul. 2, 2020

(87) PCT Pub. No.: WO2019/150017
PCT Pub. Date: Aug. 8, 2019

(65) Prior Publication Data
US 2020/0374606 A1    Nov. 26, 2020

(30) Foreign Application Priority Data
Feb. 1, 2018  (FR) .................................. 1850848

(51) Int. Cl.
*H04Q 9/00* (2006.01)
*B60C 23/04* (2006.01)
(Continued)

(52) U.S. Cl.
CPC ........... *H04Q 9/00* (2013.01); *B60C 23/0479* (2013.01); *G07C 5/008* (2013.01); *G07C 5/0841* (2013.01);
(Continued)

(58) Field of Classification Search
CPC ........... H04Q 2209/00; H04Q 2209/10; H04Q 2209/20; H04Q 2209/40; H04Q 2209/43;
(Continued)

(56) References Cited

U.S. PATENT DOCUMENTS 6,825,758 B1 * 11/2004 Laitsaari ............. B60C 23/0408
                                                        340/442
8,014,763 B2 * 9/2011 Hymes ............... H04M 1/72403
                                                        455/414.2
(Continued)

FOREIGN PATENT DOCUMENTS

CN    105059065 A    11/2015
CN    107276612 A    10/2017
(Continued)

OTHER PUBLICATIONS

Chinese Search Report for Chinese Application No. 201980011233.2, dated Nov. 12, 2021, 2 pages.
(Continued)

*Primary Examiner* — Franklin D Balseca
(74) *Attorney, Agent, or Firm* — RatnerPrestia (57) ABSTRACT

A method for communication of a plurality of wheel units with one another and with a device for remotely monitoring and/or controlling the wheel units, the wheel units measuring a pressure value of a wheel of a motor vehicle as parameter(s). The units are identified beforehand and each wheel unit may identify the other wheel units, the communication taking place in accordance with a communication standard allowing a bidirectional data exchange. A hub
(Continued)

wheel unit storing the pressure values measured by each of the wheel units is selected at least temporarily, the other units being peripheral. The hub unit sends a signaling frame in the direction of the peripheral units, received in a peripheral unit through scanning. The pressure values are communicated between the wheel units and a device solely via the hub unit.

15 Claims, 5 Drawing Sheets

(51) Int. Cl.
*G07C 5/00* (2006.01)
*G07C 5/08* (2006.01)
(52) U.S. Cl.
CPC ..... *H04Q 2209/10* (2013.01); *H04Q 2209/43* (2013.01); *H04Q 2209/753* (2013.01); *H04Q 2209/826* (2013.01); *H04Q 2209/86* (2013.01)
(58) Field of Classification Search
CPC ........... H04Q 2209/50; H04Q 2209/70; H04Q 2209/753; H04Q 2209/80; H04Q 2209/826; H04Q 2209/86; H04Q 2209/88; H04Q 2209/883; H04Q 9/00; G07C 5/008; G07C 5/0841; B60C 23/0479
See application file for complete search history.

(56) References Cited

U.S. PATENT DOCUMENTS

| | | | |
|---|---|---|---|
| 10,171,969 B2* | 1/2019 | Lam | H04W 4/02 |
| 10,226,973 B2 | 3/2019 | Guinart et al. | |
| 2003/0164031 A1 | 9/2003 | Nantz et al. | |
| 2017/0203619 A1 | 7/2017 | Gow et al. | |
| 2018/0357598 A1* | 12/2018 | Williams | G06K 7/06 |

FOREIGN PATENT DOCUMENTS

| | | |
|---|---|---|
| EP | 1172237 A2 | 1/2002 |
| JP | 2014076748 A | 5/2014 |
| KR | 101326027 B1 | 11/2013 |

OTHER PUBLICATIONS

International Search Report and Written Opinion for International Application No. PCT/FR2019/050131, dated Mar. 18, 2019, with partial translation, 8 pages.
International Search Report and Written Opinion for International Application No. PCT/FR2019/050131, dated Mar. 18, 2019, 12 pages (French).

* cited by examiner

METHOD FOR COMMUNICATION BETWEEN A PLURALITY OF WHEEL UNITS WITH ONE ANOTHER AND WITH A REMOTE MONITORING AND/OR CONTROL DEVICE

CROSS REFERENCE TO RELATED APPLICATIONS

This application is the U.S. National Phase Application of PCT International Application No. PCT/FR2019/050131, filed Jan. 22, 2019, which claims priority to French Patent Application No. 1850848, filed Feb. 1, 2018, the contents of such applications being incorporated by reference herein.

FIELD OF THE INVENTION

The present invention relates to a method for communication between a plurality of electronic modules, called wheel units, with one another, on the one hand, and between the plurality of wheel units and said at least one device for remotely monitoring and/or controlling the wheel units, on the other hand, each of the wheel units being associated with a respective wheel of a motor vehicle and measuring, as parameter(s) associated with a wheel, at least one pressure value of a tire of the respective wheel.

The invention also relates to a system for communication between wheel units each associated with a wheel of a motor vehicle and between one of the wheel units, called hub wheel unit, and at least one device for remotely monitoring and/or controlling the wheel units.

BACKGROUND OF THE INVENTION

Nowadays, in a motor vehicle, it is known to mount an electronic measurement module comprising one or more sensors in each wheel in order in particular to detect an anomaly with the wheel. These sensors may for example be a tire inflation pressure sensor and/or a wheel acceleration sensor.

These sensors, and in particular inflation pressure sensors, are mounted in electronic modules, called "wheel units", of a tire pressure monitoring system, of the type known under the abbreviation "TPMS".

As is known, the wheel units generally comprise a microprocessor, a memory, a radiofrequency transmitter, a supply battery, a pressure sensor and, if applicable, at least one other sensor such as a radial acceleration sensor capable of measuring the radial accelerations of the wheel or a temperature sensor, mounted on a support forming a printed circuit board or "PCB".

According to the prior art, each wheel unit associated with a wheel of the motor vehicle sends its measurements to a central electronic unit for controlling the wheel units that is integrated in the motor vehicle and/or a mobile telephone provided with an application for communicating with the wheel units, the central electronic unit and the mobile telephone being grouped together below under the name of device for remotely monitoring and/or controlling the wheel units.

To this end, each wheel unit transmits signals to one or more devices for remotely monitoring and/or controlling the wheel units comprising coded messages containing the measurements or other information processed and/or supplied by the wheel units.

As other information, mention may be made of information relating to the geometry of the wheel, in particular of the rim and/or of the tire or to the history of the wheel, in particular its mileage, of specific application data, in particular an identification of the wheel units, a location of the wheel on the vehicle and other configurations of the system. Finally, the processed and/or supplied information may relate to configuration parameters of the software application, or even the executable code in the case of remote reprogramming of the wheel units.

In existing solutions, each wheel unit transmits the signals over one and the same type of radio communication link independently of the other wheel units. Such operation means that each wheel unit has to transmit the same message several times with a significant power in order to ensure that the remote monitoring and/or control device(s) receive a frame at least once, this being all the more pronounced if the wheel unit is mounted in a poorly located wheel, in terms of power, in relation to the monitoring device(s), this consuming energy and degrading the energy budget for each wheel unit.

Such a method of feeding back measurements from the wheel units to the remote monitoring and/or control device(s) is not effective and significantly reduces the service life of the battery of the wheel units, thereby requiring excessively frequent maintenance and therefore exhibiting a major drawback.

One disadvantage of such a communication mode according to the prior art occurs in particular, but not only, when the motor vehicle is at a standstill and a wheel unit needs to communicate an alert regarding a pressure drop in the tire of the wheel associated with the device(s) for remotely monitoring the wheel units, in particular in the case where a user of the vehicle has a mobile telephone or technical equivalent capable of communicating with the wheel units in order to warn him of the pressure drop before the user starts the motor vehicle.

The wheel unit then has to send information frames to the user, but does so at the predetermined periodicity for the wheel units so as not to excessively increase their consumption. It may be the case that the information does not reach the user before the vehicle is started, which may jeopardize the safety of the user who becomes a driver.

SUMMARY OF THE INVENTION

The problem underlying the present invention is, for a system for communication between wheel units and at least one device for remotely monitoring and/or controlling the wheel units, to increase the speed and efficiency of communications between the wheel units and the device while at the same time not consuming more energy for these communications.

To this end, an aspect of the present invention relates to a method for communication between a plurality of electronic modules, called wheel units, with one another, on the one hand, and between the plurality of wheel units and at least one device for remotely monitoring and/or controlling the wheel units, on the other hand, each of the wheel units being associated with a respective wheel of a motor vehicle and measuring, as parameter(s) associated with a wheel, at least one pressure value of a tire of the respective wheel, each wheel unit being identified beforehand, each wheel unit being able to identify the other wheel units capable of communicating therewith, the communication taking place in accordance with a communication standard allowing a bidirectional data exchange, characterized in that:

the communication takes place in accordance with a communication standard allowing a bidirectional data exchange, one wheel unit from among the wheel units is selected at least temporarily to be a hub wheel unit storing the pressure values measured and transmitted to the hub wheel unit by each of the wheel units, the other wheel units of the motor vehicle being peripheral wheel units, the hub wheel unit periodically sending at least one signaling frame in the direction of the peripheral wheel units, this signaling frame being received by a peripheral wheel unit when a scanning function is activated in the peripheral wheel unit, said peripheral wheel unit sending a signal back to the hub wheel unit when the hub wheel unit requests it or when the peripheral wheel unit has information to send to the hub wheel unit, the communication between the plurality of wheel units and said at least one device for remotely monitoring and/or controlling the measured pressure values of each of the wheels taking place solely via the hub wheel unit.

A hub wheel unit is selected and maintained at least temporarily in the sense that this may be performed for specific operating conditions of the motor vehicle, in particular when it is at a standstill, this being the preferred embodiment of the present invention.

A hub wheel unit may also be maintained temporarily since this wheel unit may be replaced by another wheel unit of the motor vehicle as hub wheel unit. Finally, it is not ruled out for one and the same wheel unit to constantly be a hub wheel unit for all operating conditions of the vehicle, although this embodiment is not the preferred embodiment of the present invention.

According to one exemplary embodiment, the communication between a plurality of electronic modules, called wheel units, with one another, on the one hand, and between the plurality of wheel units and said at least one device for remotely monitoring and/or controlling the wheel units, on the other hand, takes place in accordance with a communication standard allowing a very short distance bidirectional data exchange using HF ("high-frequency") or UHF ("ultra-high-frequency") radio waves.

A very short distance data exchange using HF or UHF radio waves allows a bidirectional data exchange using the same type of waves at reception as at transmission, and not radiofrequency waves in one direction and low-frequency waves in the other direction, thereby no longer requiring the use of different transmission and reception devices.

Having communication between a hub wheel unit and the monitoring and/or control device(s) makes it possible to improve the communication and for example to accentuate the sending rate of the measured pressure values of each of the wheels to the device(s) and thus to warn the driver of a possible pressure alert on a tire, for example when the vehicle is at a standstill before the driver has entered the vehicle while approaching the motor vehicle, the device then being a mobile telephone provided with a specific application.

The method according to an aspect of the present invention makes it possible to set up bidirectional communication firstly between the hub wheel unit and a remote monitoring and/or control device almost immediately. After a connection has been resolved and processed by the hub wheel unit, this hub wheel unit relays a connection request to the other wheel units fitted to the vehicle, which have become peripheral wheel units, such that, in turn, the wheel units become available for connection for a limited duration, in most cases, via the hub wheel unit. The desired aim is to improve the responsiveness of the wheel units when a user prepares to establish successive communications with each of them.

It is thus possible to achieve an energy saving and increase the autonomy of the wheel units. According to the prior art, each wheel unit sent an information frame containing the pressure value of the tire of the wheel associated with the wheel unit to one or more monitoring and/or control devices. According to an aspect of the invention, the hub wheel unit groups together all of these various frames into a single frame.

The main advantage of an aspect of the present invention is achieved when using the method for a vehicle at standstill, but this is not limiting, with the method according to an aspect of the invention also being able to be implemented while moving.

The information about the critical tire pressures may thus be available before starting to drive the motor vehicle, while at the same time keeping an acceptable energy consumption in a context of limiting of energy expenditure for critical pressure events.

The bidirectional connection between the hub wheel unit and the monitoring and/or control device, for example a mobile telephone or the central control unit inside the vehicle, may be maintained upon request from the user if re-inflation is going to be performed, thereby allowing the driver to monitor the re-inflation.

Advantageously, the hub wheel unit is replaced by a peripheral wheel unit and becomes a peripheral wheel unit again according to the following criteria, which are taken individually or in combination:

an operating duration of a wheel unit as hub wheel unit,
a charge value of a battery of the hub wheel unit dropping below a predetermined value,
a charge value of a battery of a peripheral wheel unit that is the highest of the batteries of the peripheral wheel units being higher than the charge value of the battery of the hub wheel unit by a predetermined ratio,
said at least one remote monitoring and/or control device identifying that the operation of the hub wheel unit is deficient, or criteria specific to the motor vehicle or to the road such as a stopping position of the vehicle influencing the communication of the hub wheel unit, or, when the vehicle is at a standstill,
designation of a peripheral wheel unit to become the hub wheel unit for the duration of the stoppage.

Due to the communication between a hub wheel unit and peripheral wheel units, it may be possible to distribute the energy expenditure over the various wheel units comprising the system. For example, without limitation, a hub wheel unit that has detected that it is no longer able to perform its function of hub unit then changes to transmission mode for a defined duration and indicates that it is to be relayed by a peripheral wheel unit, and so on. Ultimately, the user arriving in the vicinity of his vehicle may receive the pressure information, in particular a pressure alert, almost immediately via a hub wheel unit that is the most suitable for sending this communication.

Advantageously, the hub wheel unit is replaced by a peripheral wheel unit as follows:

upon request from said at least one remote monitoring and/or control device, communicated to the hub wheel unit or at the instigation of the hub wheel unit, the hub wheel unit sending, in these two cases, a replacement request associated with said at least one signaling frame in the direction of the peripheral wheel units, a peripheral wheel unit receiving the replacement request when its scanning function is activated so as to receive said at least one signaling frame and the replacement request and responding to the hub wheel unit in this sense, or upon return request from a peripheral wheel unit sending a replacement return request frame to the hub wheel unit, after receiving said at least one signaling frame through scanning, with, in all cases, the what is called old hub wheel unit going into standby and being replaced by said peripheral wheel unit as new hub wheel unit after the old hub wheel unit has communicated the stored pressure values measured by each of the wheel units to the new hub wheel unit, the new hub wheel unit informing or not informing said at least one remote monitoring and/or control device of the change of hub wheel unit.

The information from the monitoring and/or control device is requested when this device is the central electronic unit for controlling the wheel units that is integrated in the motor vehicle. By contrast, if the monitoring device is a mobile telephone, the information about the change of hub wheel unit is not obligatory, since this change is not necessarily made on the initiative of the mobile telephone, which means that it is not necessarily in the vicinity when the role changes. It is therefore not necessary to inform it about this in order to accomplish this change.

A remote monitoring and/or control device, primarily a central electronic unit for controlling the wheel units that is integrated in the motor vehicle, has all of the data necessary to make such a replacement decision. For example, the monitoring device may determine that a hub wheel unit having a sufficient charge or not having exceeded a maximum time as a wheel unit is deficient, in which case this hub wheel unit should be replaced.

Deficient should be understood in its broad sense, and this deficiency may be only temporary and caused by the positioning of a hub wheel unit that is otherwise operating normally. For example, when the vehicle is at a standstill, a hub wheel unit may be kept in a position corresponding to an area of non-transmission or of insufficient transmission, in which case the central electronic unit quickly detects this and orders replacement of the hub wheel unit.

The replacement may also be ordered by the hub wheel unit, for example after a predetermined operating duration as hub wheel unit or the charge of its battery, each wheel unit advantageously having a time counter. This replacement may also be requested by a peripheral wheel unit. This makes it possible to distribute the energy expenditure over all of the wheel units.

In one particular case, there may be no replacement of the hub wheel unit, which always remains the same, in which case its autonomy has to be increased through the presence of a battery having a possibility of greater recharging, or the hub wheel unit has to be exchanged more regularly than the peripheral wheel units. This is not preferred. Advantageously, at least when the vehicle is at a standstill, the peripheral wheel units are on standby except for a scanning operation that is activated at predetermined periodic time intervals or when a tire pressure alert for a pressure value lower than a predetermined minimum pressure value is detected, or when a downward pressure variation of more than a predetermined value with respect to the pressure value stored in the hub wheel unit for the tire associated with the peripheral wheel unit is detected or when a downward pressure variation rate of more than a predetermined value with respect to the pressure variation rate value stored in the hub wheel unit for the tire associated with the peripheral wheel unit is detected, in which cases, after an alert scan, the peripheral wheel unit connects and transmits the alert and the detected pressure value back to the hub wheel unit, the hub wheel unit then transmitting the alert and the detected pressure value to said at least one remote monitoring and/or control device, said at least one monitoring and/or control device receiving the alert attesting to the receipt of the alert at the hub wheel unit and acknowledging it in return for the hub wheel unit.

The pressure variation rate may for example be based on a negative gradient or a leak rate. In the case of a connected network allowing a bidirectional data exchange, the peripheral unit that detected a pressure drop may make itself available for connection to the hub unit, which sends an alert to the monitoring and/or control device(s). After receiving the alert, the device(s) may then automatically connect to the hub unit in order to delete the alert, thus avoiding unnecessary energy expenditure. Advantageously, scanning not activated at predetermined periodic time intervals is triggered by the peripheral wheel unit if this peripheral wheel unit detects an internal electronic failure following a self-test operation that the peripheral wheel unit performs regularly.

Advantageously, when an alert is transmitted while the motor vehicle is at a standstill, the hub wheel unit may transmit the alert and the detected pressure value or the detected electronic deficiency to said at least one remote monitoring and/or control device at a sustained rate of the order of 4 seconds, the rate being greater than that of transmission from a wheel unit to said at least one remote monitoring and/or control device when no hub wheel unit has been selected.

The transmission rate from a wheel unit to said at least one remote monitoring and/or control device without an alert is rather set at 10 seconds. Transmitting at a sustained rate allows a device carried by a user or a central control unit to immediately detect the pressure alert, in the first case when the user arrives in the vicinity of the vehicle and before he gets behind the wheel. For reasons of electricity consumption, this sustained transmission is however limited in terms of time, for example three days.

This may apply when re-inflating a tire, but with an even more sustained rate of the order of one second, since the pressure increase must be carefully monitored.

Advantageously, a hub wheel unit communicating with peripheral wheel units is selected only when it is detected that the motor vehicle is at a standstill and continues for as long as the vehicle is at a standstill, the hub wheel unit and the peripheral wheel units becoming wheel units communicating directly with said at least one monitoring and/or control device again as soon as the motor vehicle is moving.

This makes it possible to warn the user, for example via his mobile telephone, of a drop in tire pressure, before he gets behind the wheel of the motor vehicle. This could not be achieved according to the prior art, with no alert being launched before the vehicle is started, or being launched with an excessively large spacing between the alerts.

The sustained rate of transmission of the alert by the hub wheel unit is higher than the typical rate of transmission by a wheel unit in conventional operation, thereby increasing the probability of interception of the alert by the driver approaching his vehicle, and therefore before starting the vehicle. The driving safety of the vehicle is considerably enhanced thereby.

Advantageously, when said at least one monitoring and/or control device requests connection to at least one peripheral wheel unit, said at least one monitoring and/or control device informs said at least one hub wheel unit, which sends, to said at least one peripheral wheel unit, a frame telling said at least one peripheral wheel unit to prepare for direct connection to said at least one monitoring and/or control device, said at least one peripheral wheel unit sending preparation confirmation signaling frames to said at least one monitoring and/or control device at a sustained rate of the order of 4 seconds, the rate being greater than a transmission rate from a wheel unit to said at least one remote monitoring and/or control device when no hub wheel unit has been selected and when, after a predetermined duration, no connection succeeds, said at least one peripheral wheel unit returns to a standby state.

This represents an optional embodiment implemented under specific conditions and that does not contradict the main embodiment of the invention, providing that the communication between the plurality of wheel units and said at least one device for remotely monitoring and/or controlling the measured pressure values of each of the wheels takes place only via the hub wheel unit.

This main embodiment does not exclude the fact that, under some conditions, in particular in order to download data from said at least one monitoring device, the peripheral units make themselves available for direct connection to said at least one monitoring device, therefore without passing via the hub wheel unit, although the hub wheel unit helps to establish this direct connection at the start.

Advantageously, when said at least one monitoring and/or control device communicates data to be downloaded, forming or not forming a program, to the hub wheel unit, the hub wheel unit communicates said at least one signaling frame in the direction of at least one peripheral wheel unit telling said at least one peripheral wheel unit to prepare for direct connection to said at least one monitoring and/or control device or to the hub wheel unit in order to sequentially send the data to be downloaded from said at least one monitoring and/or control device to each peripheral wheel unit directly or via the hub wheel unit in order to store the data to be downloaded in said at least one peripheral wheel unit, said at least one peripheral wheel unit sending preparation confirmation signaling frames back to said at least one monitoring and/or control device or to the hub wheel unit.

Data may therefore be downloaded either via the hub wheel unit or directly between the device and a peripheral wheel unit.

Advantageously, said at least one peripheral wheel unit sequentially receives the data to be downloaded for a predetermined download duration, beyond which the download is interrupted, said at least one peripheral wheel unit then returning to standby and, if necessary, said at least one monitoring and/or control device returning to idle operation.

This case applies primarily to the embodiment in which downloading does not take place via the hub unit. In the latter case, it may be the case that said at least one monitoring and/or control device is already in idle operation having communicated the data to be downloaded to the hub wheel unit, which is then solely responsible for the download.

Setting a maximum download duration represents security in terms of energy saving by making it possible to stop a download that does not take place in normal conditions and that may last too long or indefinitely. Such a maximum duration may be implemented before downloading when no preparation confirmation signaling frame has been sent from a peripheral wheel unit to said at least one monitoring and/or control device or to the hub unit.

An aspect of the invention also relates to a system for communication between wheel units each associated with a wheel of a motor vehicle and between one of the wheel units, called hub wheel unit, and said at least one device for remotely monitoring and/or controlling the wheel units, each of the wheel units having at least means for measuring the pressure of a tire mounted on a rim, forming the wheel respectively associated with each wheel unit, the system implementing such a method, this communication system being noteworthy in that said at least one remote monitoring and/or control device comprises:

means for identifying each wheel unit by way of respective identification parameters and means for communicating, to each wheel unit, its identification parameters and identification parameters of the other wheel units, each wheel unit comprising means for transmitting and receiving frames in accordance with a communication standard allowing a bidirectional data exchange, means for selecting one wheel unit from among the wheel units to be a hub wheel unit storing the pressure values measured and transmitted to the hub wheel unit by each of the wheel units, the other wheel units of the motor vehicle being peripheral wheel units, the hub wheel unit and the peripheral wheel units comprising scanning means for detecting transmitted frames, each wheel unit comprising means for storing data relating to the pressure of the tires of the vehicle and means for developing signaling frames intended for the hub wheel unit and/or said at least one monitoring and/or control device.

According to one exemplary embodiment, each wheel unit comprises means for transmitting and receiving frames in accordance with a communication standard allowing a very short distance bidirectional data exchange using HF ("high-frequency") or UHF ("ultra-high-frequency") radio waves.

Advantageously, said at least one remote monitoring and/or control device is a central electronic unit for controlling the wheel units that is integrated in the motor vehicle and/or a mobile telephone provided with an application for communicating with the wheel units.

BRIEF DESCRIPTION OF THE DRAWINGS

Other features, aims and advantages of aspects of the present invention will become apparent on reading the detailed description that follows and on examining the appended drawings given by way of non-limiting examples, and in which.

DETAILED DESCRIPTION OF THE PREFERRED EMBODIMENTS

In the figures, four pressure values P1 to P4 are shown, corresponding to four distinctive wheels. This is not limiting, and the number of wheels of the motor vehicle may be higher, for example by 10, which is the case for a truck.

Likewise, the hub wheel unit C is referenced Id4 and the peripheral wheel unit is referenced Id1, this being purely arbitrary, the hub wheel unit C being able to be any of the wheel units, in particular with the identifiers Id2 and Id3 or Idn, not referenced in the figures.

Figure 1:
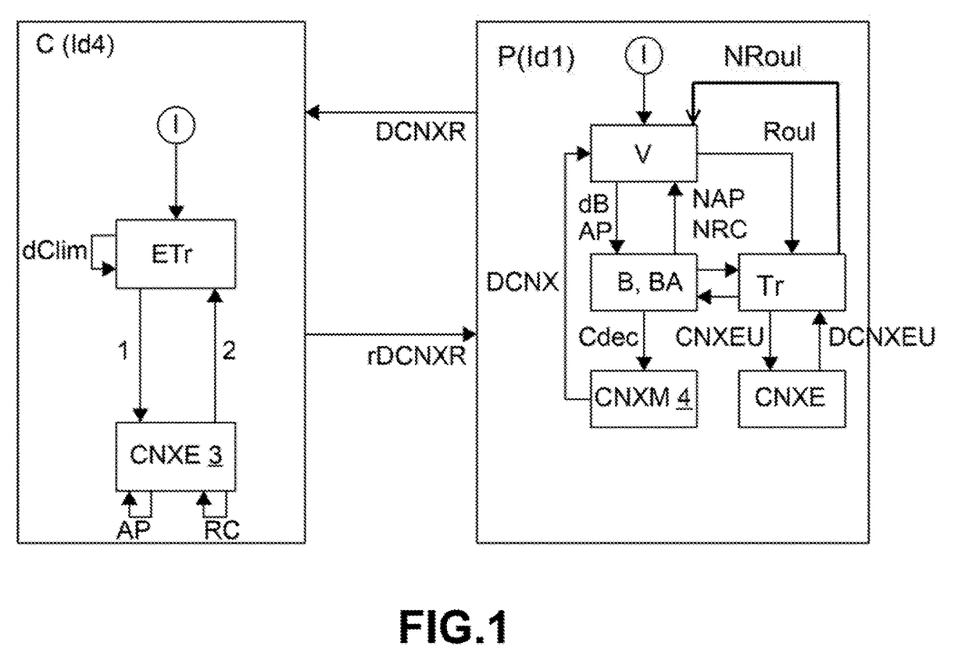
FIG. 1 shows a hub wheel unit and a peripheral wheel unit with the detail of the connection between the two wheel units, the communication between the two wheel units taking place using a method according to an aspect of the present invention.
Figure 2:
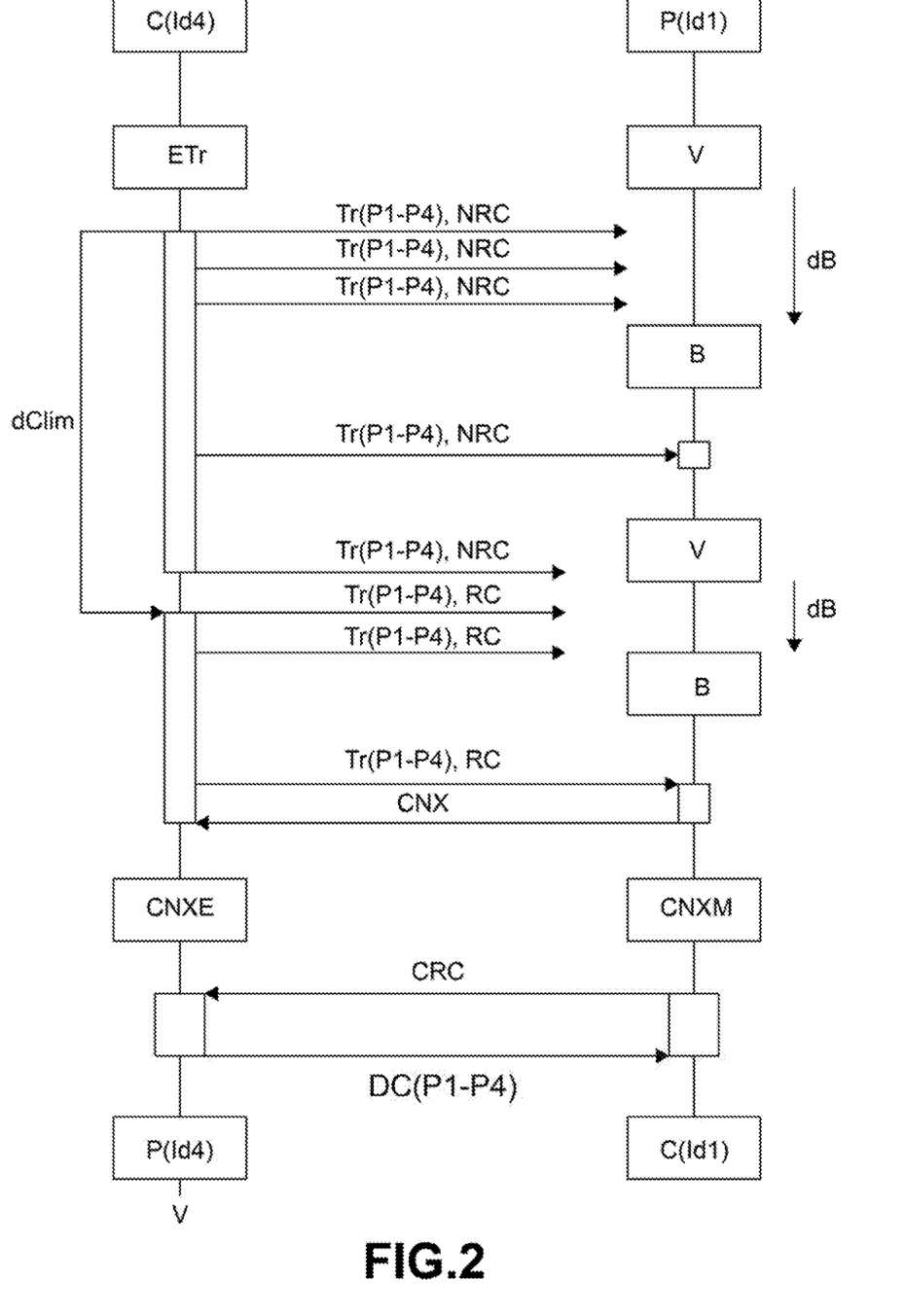
FIG. 2 illustrates communication between a hub wheel unit and a peripheral wheel unit with a request to replace the hub wheel unit with the peripheral wheel unit, transmitted by the hub wheel unit, the peripheral wheel unit then becoming the hub wheel unit and the old hub wheel unit becoming a peripheral wheel unit, FIG. 2 thus illustrating a first implementation scenario for the communication method according to an aspect of the invention.
Figure 3:
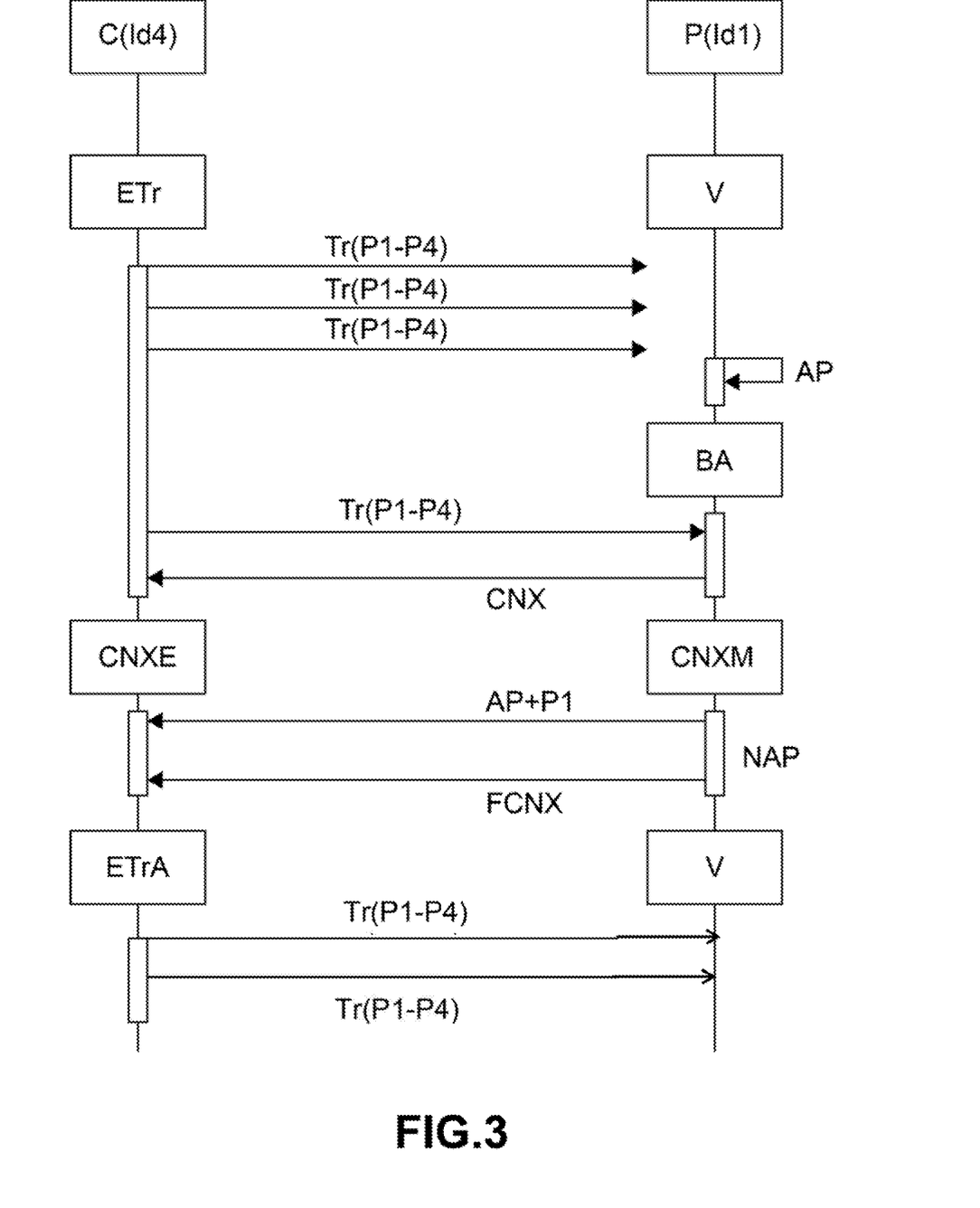
FIG. 3 illustrates communication between a hub wheel unit and a peripheral wheel unit, the peripheral wheel unit having triggered an alert regarding a pressure drop in the tire of the wheel associated with the peripheral wheel unit and transmitting the alert and the pressure value of the wheel to the hub wheel unit, FIG. 3 thus illustrating a second implementation scenario for the communication method according to an aspect of the invention.
Figure 4:
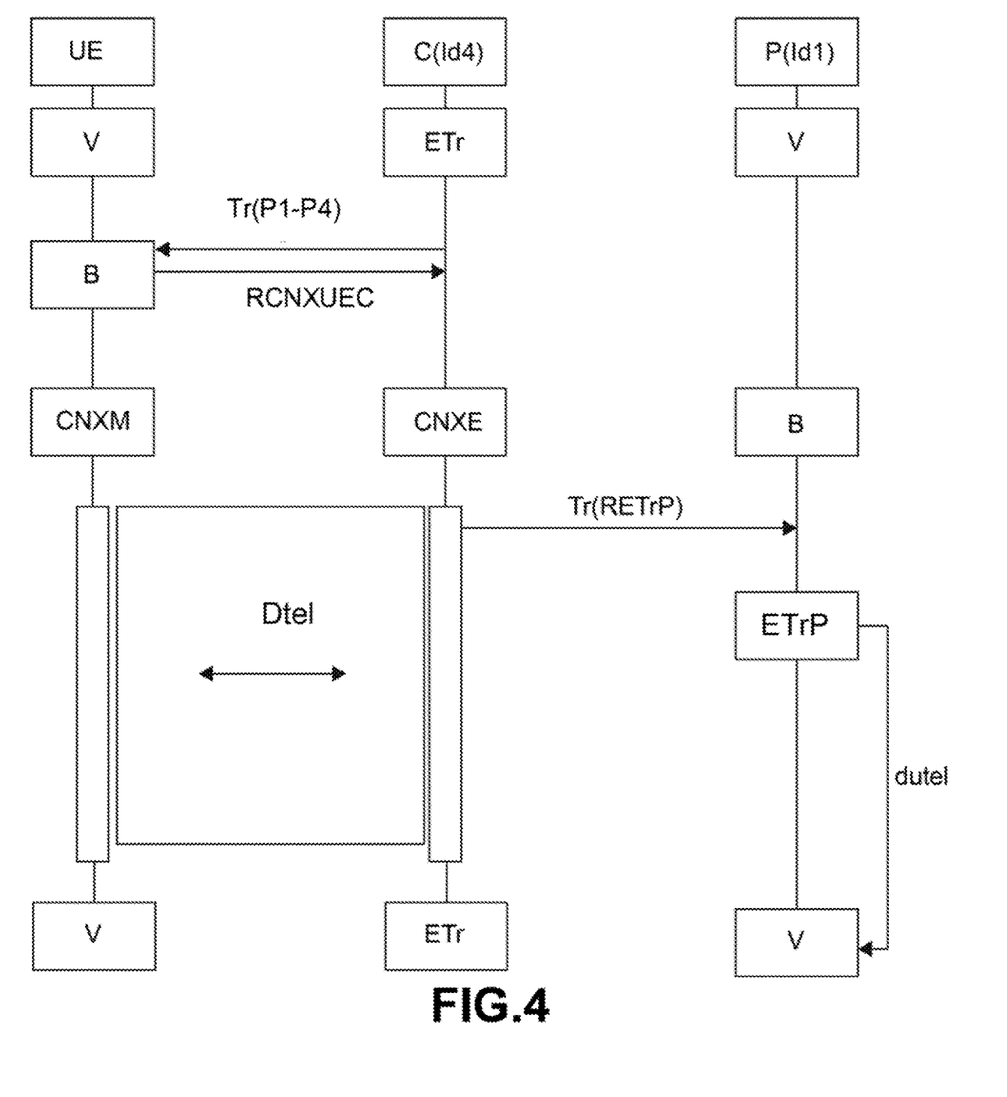
FIG. 4 illustrates communication between a hub wheel unit and a device for remotely monitoring and/or controlling the wheel units, on the one hand, and the hub wheel unit and a peripheral wheel unit, on the other hand, in order to inform the latter that data are able to be downloaded from the monitoring and/or control device, the peripheral wheel unit and the hub wheel unit being placed sequentially in a state allowing the reception-based connection to the monitoring and/or control device, FIG. 4 thus illustrating a third implementation scenario for the communication method according to an aspect of the invention, the download not succeeding in this FIG. 4.
Figure 5:
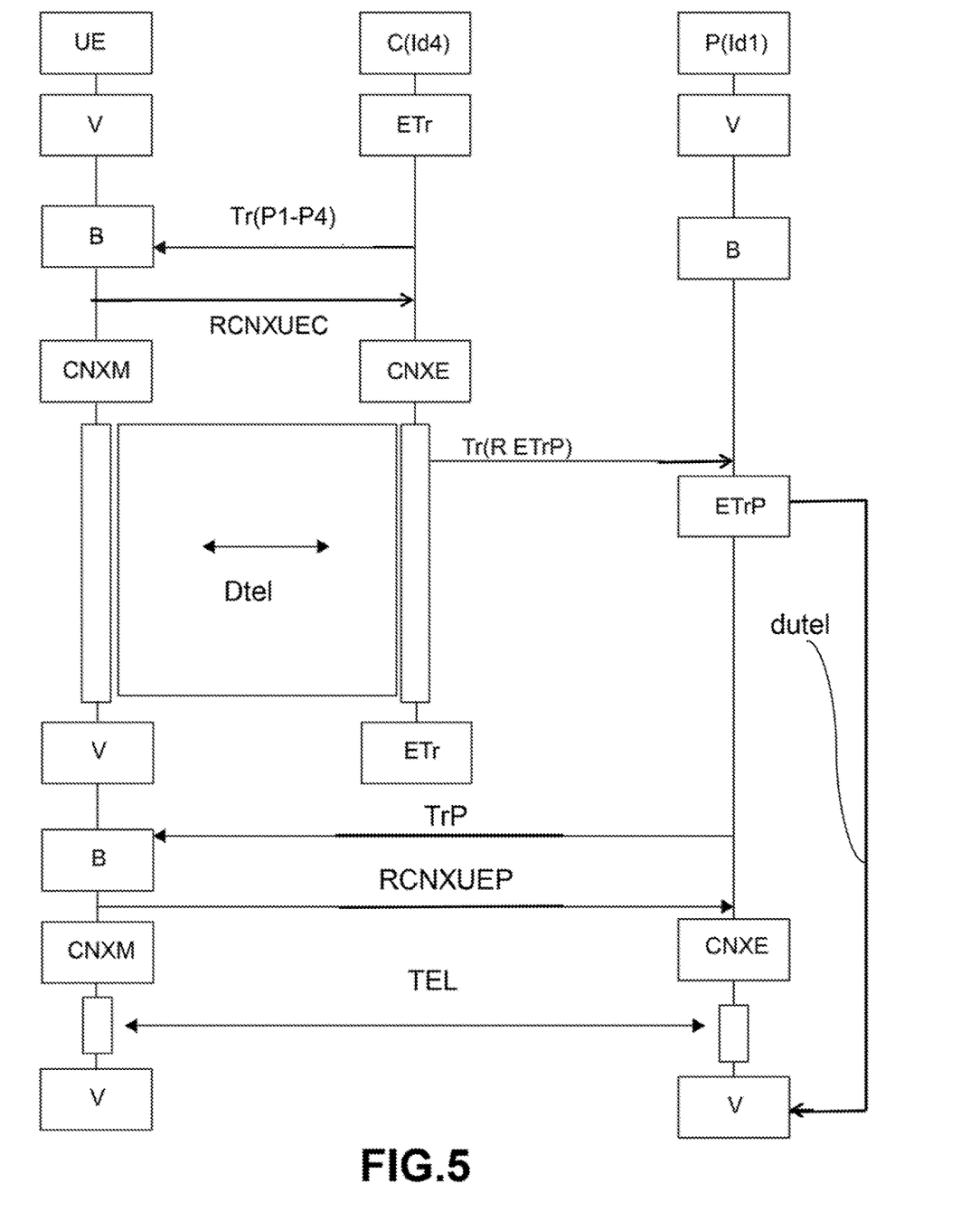
FIG. 5 illustrates communication between a hub wheel unit and a device for remotely monitoring and/or controlling the wheel units, on the one hand, and the hub wheel unit and a peripheral wheel unit, on the other hand, similar to that shown in FIG. 4 in accordance with the third scenario, the download being effective in this FIG. 5.

With reference to all of the figures, an aspect of the present invention relates to a method for communication between a plurality of electronic modules, called wheel units, with one another, on the one hand, this being shown in FIGS. 1 to 3 and between the plurality of wheel units and said at least one device UE for remotely monitoring and/or controlling the wheel units, on the other hand, this being shown in FIGS. 4 and 5 by communication between a hub wheel unit C and a peripheral wheel unit P. As known from the prior art, each of the wheel units is associated with a respective wheel of a motor vehicle and measures, as one or more parameters associated with a wheel, at least one pressure value P1 to P4 of a tire of the respective wheel.

Without being exhaustive, as other parameters, mention may be made of a tire temperature and a wheel rotational speed measured by an accelerometer possibly present in the wheel unit. The temperature values are particularly interesting to monitor in order to detect air leaks from the tire associated with a wheel unit.

According to an aspect of the invention, each wheel unit is identified beforehand, each wheel unit being able to identify the other wheel units capable of communicating therewith. Each wheel unit has an identifier, and only two identifiers are illustrated in the figures, specifically Id1 and Id4, but this is not limiting. This information may be transmitted and propagated to the wheel units during connections to a remote monitoring and/or control device UE during an initial configuration/learning phase, the reference UE being visible in FIGS. 4 and 5.

Since all of the wheel units recognize the wheel units that are associated therewith, each wheel unit may become a hub wheel unit C which acts as a relay between all of the wheel units and one or more monitoring and/or control devices UE, and which communicates and collects all of the pressure values P1 to P4 measured respectively by itself and the other wheel units, called peripheral wheel units P.

Communication, both between the hub wheel unit C and each of the peripheral wheel units P and between the hub wheel unit C and the monitoring and/or control device(s) UE, takes place in accordance with a communication standard allowing a bidirectional data exchange.

According to one beneficial but in no way limiting example, communication, both between the hub wheel unit C and each of the peripheral wheel units P and between the hub wheel unit C and the monitoring and/or control device(s) UE, takes place in accordance with a communication standard allowing a very short distance bidirectional data exchange using HF ("high-frequency") or UHF ("ultra-high-frequency") radio waves.

According to one exemplary embodiment that is in no way limiting, the communication standard is a Bluetooth® communication standard. Using a Bluetooth® standard also allows interaction with mobile telephones and architectures for future motor vehicles, which will centralize Bluetooth® communication for a plurality of vehicle systems, in particular for tire pressure monitoring systems, hands-free opening or starting systems and for various connection options in vehicles.

Although it is expanding for various communications used in a vehicle, such a standard had never been used for the connection between wheel units, on the one hand, and a remote monitoring and/or control device, on the other hand, due to increased energy expenditure. There was no provision to make the wheel units communicate with one another in the prior art, each wheel unit corresponding directly to the monitoring and/or control device(s).

What hampered the development of a Bluetooth® protocol in the motor vehicle sector for wheel units was its energy expenditure, given the need to transmit signaling frames or beacons in order to allow possible connection, and to do so essentially in parking mode, which ultimately made the Bluetooth® protocol a greater consumer than a conventional radiofrequency system.

An aspect of the present invention, by centralizing a large part of the communications between wheel units, on the one hand, and wheel units and a remote monitoring and/or control device by way of a single hub wheel unit, and doing so for the majority of communications, makes it possible to reduce energy consumption and makes it viable to use a Bluetooth® protocol for a tire pressure monitoring system in a vehicle.

RF ("radiofrequency") communication or even non-homogeneous bidirectional RF/LF ("radiofrequency"/"low-frequency") communication may also be contemplated in order to ensure bidirectional data communication.

One wheel unit Id4 from among the wheel units is therefore at least temporarily selected to be a hub wheel unit C storing the pressure values P1 to P4 measured and transmitted to the hub wheel unit C by each of the wheel units, the other wheel units of the motor vehicle being the peripheral wheel units P, only one of which is shown in the figures under the reference P with an arbitrary identifier Id1. This selection of a wheel unit as a hub wheel unit C may be arbitrary and limited in terms of duration, such that all of the wheel units may in turn become a hub wheel unit C.

The hub wheel unit C periodically sends at least one signaling frame Tr in the direction of the peripheral wheel units P. This signaling frame Tr serves to inform the peripheral wheel units P of the presence of the hub wheel unit C and gives them the possibility to communicate back with the hub wheel unit C, which takes place if the peripheral wheel unit P has data or requests to transmit to the hub wheel unit C or if it has been asked to connect thereto.

For reasons of electrical autonomy, the peripheral wheel units P are not constantly in a state to receive the signaling frames Tr sent by the hub wheel unit C. The hub wheel unit C therefore regularly and periodically sends signaling frames Tr, advantageously between half a second and 10 seconds, with auxiliary requests if necessary.

The peripheral wheel units P may be put into a standby state V that the peripheral wheel units P are able to leave upon an insufficient pressure alert AP for the tire of the associated wheel, this being illustrated in FIG. 3, or during a scan B provided at regular intervals, this being illustrated in FIG. 2.

The signaling frame Tr is received by a peripheral wheel unit P when a scanning function B, BA is activated in a peripheral wheel unit P. This is shown in particular in FIG. 2, in which the scanning function B of a peripheral wheel unit P is activated periodically at the end of each time period dB. In another scenario, shown in FIG. 3, when a pressure alert AP is triggered for a peripheral wheel unit P, a non-periodic scanning function BA is automatically activated by the presence of the pressure alert AP, bringing the peripheral wheel unit P in question out of standby V.

After detecting the signaling frame Tr sent by the hub wheel unit C, each peripheral wheel unit P may send a connection return signal CNX to the hub wheel unit C, if this peripheral wheel unit P has data to transmit to the hub wheel unit C or is called upon by the hub wheel unit C for connection.

When a peripheral wheel unit P in scanning mode captures a frame from the hub wheel unit C, the peripheral wheel unit P may respond thereto if it has to update information or manifest its response so that the system, failing this, is eventually able to detect a mute and/or faulty peripheral wheel unit P. The peripheral wheel unit P should respond to the frame if the hub wheel unit requests connection to the peripheral wheel unit in question.

This return signal CNX may contain information about the pressure of the tire associated with the peripheral wheel unit P, about an alert AP or about a request RC to replace the hub wheel unit C, either at the request of the hub wheel unit C or at the request of the peripheral wheel unit P or at the request of the monitoring and/or control device UE.

The communication between the plurality of wheel units and said at least one remote monitoring and/or control device UE, with regard to the measured pressure values P1 to P4 of each of the wheels, takes place only via the hub wheel unit C. It is however possible, as shown in FIGS. 4 and 5, in a particular case regarding the downloading of data Dtel contained in the monitoring and/or control device(s) UE, for this downloading to take place directly between the monitoring and/or control device(s) UE and each of the peripheral wheel units P, and to do so sequentially.

FIG. 1 shows a hub wheel unit C and a peripheral wheel unit P with an arbitrarily fixed identifier for each one, respectively Id4 and Id1, which may change by replacing the hub wheel unit C with a peripheral wheel unit P, the old hub wheel unit C becoming a peripheral wheel unit P.

The hub wheel unit C develops signaling frames Tr in a frame preparation or development module ETr, these signaling frames Tr comprising at least the pressure values P1 to P4 of all of the peripheral wheel units P by forming basic signaling frames Tr.

However, it is possible to add, to this basic signaling frame Tr, a request RC to replace the hub wheel unit C with a peripheral wheel unit P, as shown in FIG. 2, requests to prepare the peripheral wheel unit for connection to a monitoring and/or control device UE, these requests being referenced RETrP in FIGS. 4 and 5, or other information or requests. The signaling frames Tr are transmitted and capable of being received by all of the peripheral wheel units P, but also by the monitoring and/or control device(s) UE.

With continuing reference mainly to FIG. 1, it is possible to provide a maximum operating duration dClim as hub wheel unit C, at the end of which a peripheral wheel unit P becomes the hub wheel unit C as a replacement for the old one.

In possible response from the peripheral wheel unit P or from the monitoring and/or control device, if a connection request is transmitted by the hub wheel unit C or the monitoring and/or control device(s) via the hub wheel unit C, this being referenced 1 in FIG. 1, and has been received by the peripheral wheel unit P, the hub wheel unit C connects to the peripheral wheel unit P in slave mode CNXE, this being referenced 3. It may also be the case in particular embodiments that a peripheral wheel unit P connects to the monitoring and/or control device(s).

The peripheral wheel unit P may then communicate to the hub wheel unit C for example a tire pressure drop alert AP or that the hub wheel unit C will be replaced following a replacement request RC. When the communication of the information has ended, the hub wheel unit C is disconnected from the peripheral wheel unit P, this being referenced 2.

The peripheral wheel unit P with the arbitrary indicator Id1 is on standby V by default. This peripheral wheel unit P is only awoken at regular and periodic intervals dB in order to perform a scanning action B. As an alternative, the peripheral wheel unit P may also be awoken upon a tire pressure drop alert AP and perform a scan BA following an alert AP that does not fall within the periodic series of scans B, the alert AP being a random phenomenon.

Another possibility of an alert triggered by the peripheral wheel unit P is when this peripheral wheel unit P itself detects an internal electronic deficiency following a self-test operation that the peripheral wheel unit P performs regularly. In this case, a scan BA not activated at predetermined periodic time intervals dB is triggered by the peripheral wheel unit P.

When a request from the hub wheel unit C is detected Cdec by the peripheral wheel unit P, the peripheral wheel unit P establishes, at 4, a connection to the hub wheel unit C in master mode CNXM and sends the appropriate information in response, which may be the alert AP and the new falling tire pressure or a request to become the new hub wheel unit C, this information not being linked.

The peripheral wheel unit P is then disconnected from the hub wheel unit C, this being referenced DCNX and, if necessary, the unit is kept as a peripheral unit when the peripheral wheel unit P has not been identified as the replacement for the hub wheel unit C by this peripheral wheel unit P. The peripheral wheel unit P then returns to standby mode V.

As an alternative, in the case of replacement of a hub wheel unit C, the peripheral wheel unit P sends a request DCNXR to disconnect the peripheral wheel unit P from the hub wheel unit C with replacement of the hub wheel unit to the hub wheel unit C, which will no longer be the hub wheel unit C, and disconnects because the peripheral wheel unit P becomes the new hub wheel unit C. The old hub wheel unit C acknowledges receipt rDCNXR and disconnects by becoming a peripheral wheel unit P. The old hub wheel unit C that has become a new peripheral wheel unit P may go into standby.

A hub wheel unit C communicating with peripheral wheel units P may be selected only when it is detected that the motor vehicle is at a standstill and lasts for as long as the vehicle is at a standstill, the peripheral wheel units P then being mainly on standby except for when they are awoken by a signaling frame intercepted by a periodic scan B or a scan BA upon an alert.

In a standstill mode, after a periodic scan B if there has been no replacement request NRC or if there has been no pressure drop alert NAP, the peripheral wheel unit P returns to standby V.

In this particular case, in FIG. 1, Roul means that the motor vehicle has started moving again. In this case, the hub wheel unit C and the peripheral wheel units P may become wheel units communicating directly with said at least one monitoring and/or control device UE.

Moving may be detected by the wheel units themselves. In this case, the wheel units are provided with an accelerometer, this not being compulsory. Otherwise, it is the or one of the remote monitoring and/or control device(s) that communicates these movement data to each wheel unit, advantageously passing via the hub wheel unit C, the peripheral wheel units not receiving these movement data until after the next scan B.

After a scan B, BA, when a signaling frame coming from the hub wheel unit C has been detected by the peripheral wheel unit P and this signaling frame informs the peripheral wheel unit P that the vehicle is moving, a signaling frame Tr is developed by the wheel unit previously operating as peripheral wheel unit P, containing the data that the wheel unit regularly sends to at least one monitoring and/or control device when the motor vehicle is moving, this corresponding to the default behavior of a wheel unit according to the prior art.

The hub wheel unit C does the same by becoming a wheel unit again, without any function different from the other wheel units. If movement stops NRoul, each peripheral wheel unit P returns to standby V, and only the hub wheel unit C remains awake.

In another scenario, one or more monitoring and/or control devices may request connection to one or more peripheral wheel units P. In this case, the hub wheel unit C may send a request requesting connection, which is nominative or not nominative, that the wheel unit or each peripheral wheel unit P receives during a periodic scan B. The signaling frame Tr developed by the peripheral wheel unit P that received the request then comprises a confirmation of preparation of the peripheral wheel unit P for connection.

When moving, as is known, each wheel unit may connect sequentially CNXEU to a remote monitoring and/or control device and also disconnect DCNXEU, each wheel unit being connected to the remote monitoring and/or control device in slave mode CNXE.

FIG. 2 shows one particular embodiment of the present invention in the case of replacing the hub wheel unit C with a peripheral wheel unit P in its role of hub wheel unit C. The hub wheel unit C develops ETr signaling frames Tr as required, the signaling frames Tr possibly comprising the pressures of the tires P1 to P4. At the start of the sending of the signaling frames Tr in order to signal the presence of the hub wheel unit C to the peripheral wheel units P, only one of which is shown for simplicity, the first signaling frames Tr contain data relating to the pressures P1 to P4 of the tires previously communicated to the hub wheel unit C by the various peripheral wheel units P with a tire pressure measured by the hub wheel unit C itself as it relates to the tire of its associated wheel.

These first frames Tr do not contain a replacement request RC, this being identified by NRC, but the absence of a replacement request RC in a frame is enough to signify that no replacement of the hub wheel unit C is requested by this hub wheel unit C.

The single peripheral wheel unit P shown in this FIG. 2 and illustrating all of the peripheral wheel units P of all of the wheel units is on standby V and performs periodic scans B at regular time intervals dB, no pressure alert being triggered for this peripheral wheel unit P. As the first signaling frames Tr contain no replacement request, and as the pressure P1 specific to the peripheral wheel unit P with its identifier Id1 has not varied downward and no pressure alert AP has been triggered by this peripheral wheel unit P, the peripheral wheel unit P does not transmit any message back to the hub wheel unit C and returns to standby V.

In the meantime, the maximum operating duration dClim as hub wheel unit C for the wheel unit currently fulfilling the role of hub wheel unit C has been exceeded. This illustrates one possible but non-limiting criterion for replacing the hub wheel unit C with a peripheral wheel unit P.

The hub wheel unit C then transmits second signaling frames Tr containing the pressures of the tires P1 to P4 previously communicated to the hub wheel unit C by the various peripheral wheel units P, these second frames additionally containing a request RC to replace the hub wheel unit C.

After a periodic scan B and therefore reception of the replacement request, the peripheral wheel unit P for which the replacement request RC was intended establishes a connection CNX to the hub wheel unit C, in master connection mode CNXM, the hub wheel unit C then being in slave connection mode CNXE. The peripheral wheel unit P sends a replacement confirmation CRC to the hub wheel unit C indicating that this peripheral wheel unit P will replace it.

The hub wheel unit C that has become the old one returns all of the necessary data DC(P1-P4) back to the peripheral wheel unit so that the old peripheral wheel unit performs its function of new hub wheel unit C, in particular the pressure values of the tires P1-P4 captured by all of the wheel units.

The wheel unit that was previously a peripheral wheel unit P becomes the new hub wheel unit C with its identifier Id1 kept, and the old hub wheel unit C becomes a peripheral wheel unit P while keeping its identification Id4 and goes into standby V.

The hub wheel unit C may be replaced by a peripheral wheel unit P and become a peripheral wheel unit P again according to the following criteria, which are taken individually or in combination:

an operating duration dClim of a wheel unit as hub wheel unit C,     a charge value of a battery of the hub wheel unit C dropping below a predetermined value,     a charge value of a battery of a peripheral wheel unit P that is the highest of the batteries of the peripheral wheel units P being higher than the charge value of the battery of the hub wheel unit C by a predetermined ratio,     an identification by the remote monitoring and/or control device(s) UE that the operation of the hub wheel unit C is deficient.

In addition, this may take place according to criteria specific to the motor vehicle or to the road, such as a stopped position of the vehicle influencing the communication of the hub wheel unit C or, when the vehicle is at a standstill, a designation of a peripheral wheel unit to become the hub wheel unit C for the duration of the stoppage.

In the latter case, the designation may be performed by a remote monitoring and/or control device UE, in particular the central electronic unit for controlling the wheel units that is integrated in the motor vehicle or on the basis of a counter incremented by modulo N at each stop, N being the number of wheel units.

The battery charge ratio should be defined and may for example be 2, without this being limiting, the charge of the battery of the peripheral wheel unit P selected for replacement then being twice as high as the battery of the hub wheel unit C.

With reference to FIGS. 2, 4 and 5, FIGS. 4 and 5 showing a remote monitoring and/or control device UE not illustrated in FIG. 2, the hub wheel unit C may be replaced by a peripheral wheel unit P at the request of the or one of the remote monitoring and/or control device(s) UE, communicated to the hub wheel unit C, or at the instigation of the hub wheel unit C, as shown in FIG. 2.

In these two cases, the hub wheel unit C sends a replacement request RC associated with at least one signaling frame Tr in the direction of the peripheral wheel units P, a peripheral wheel unit P receiving the replacement request RC upon activation of its periodic scanning function B in order to receive said at least one signaling frame Tr and the replacement request RC and responding to the hub wheel unit C in this sense.

In addition, the hub wheel unit C may be replaced by a peripheral wheel unit P at the return request of a peripheral wheel unit P sending a replacement return request frame, which is not illustrated in the figures, to the hub wheel unit C after reception of a signaling frame Tr through scanning B.

It should be noted that, as it is the peripheral wheel unit P that instigates the replacement, the scanning of the peripheral wheel unit P may not form part of the periodic scans, but may be triggered as an alert scan by the peripheral wheel unit P for faster connection. This is however not compulsory.

In all replacement cases, the what is called old hub wheel unit C goes into standby V and is replaced by the peripheral wheel unit P as new hub wheel unit C after the old hub wheel unit C has communicated the data from a hub wheel unit DC, primarily the stored pressure values P1 to P4 measured by each of the wheel units, to the new hub wheel unit C. The new hub wheel unit C may also inform the remote monitoring and/or control device(s) UE of the change of hub wheel unit C.

FIG. 3 essentially reproduces the communication features between the hub wheel unit C and a peripheral wheel unit P shown in FIG. 2, with the difference that a pressure drop alert AP is triggered for the tire of the wheel associated with the peripheral wheel unit P instead of a replacement request. Reference will be made to the description of FIG. 2 for the references of FIG. 3 that are not repeated below. No request RC to replace the hub wheel unit C is transmitted in this FIG. 3, and the hub wheel unit C is not replaced.

As mentioned above with reference to FIG. 1, the triggering of a pressure alert AP initiates an alert scan BA that does not fall within the scope of a scan B periodically implemented by this peripheral wheel unit P.

The peripheral wheel units P then on standby V are awoken when a tire pressure alert AP is transmitted for its associated tire. This pressure value alert AP is transmitted when the pressure is below a predetermined minimum pressure value.

Within the perspective of bidirectional communication, each wheel unit may be informed of the minimum pressure reference level to be monitored, this threshold being denoted recommended cold inflation pressure or known under the acronym RCIP.

The recommended cold inflation pressure depends on the context, in particular depending on the transmission shaft on which the wheel is mounted, data from the vehicle tires and from the vehicle itself. Its range typically varies between 1.9 and 2.5 bar relative for standard hatchbacks, one bar being equal to 100,000 pascals.

Simplifying to the extreme, the alert thresholds are set between 10% and 20% below the recommended cold inflation pressure. In practice, this depends on the region and the current regulations and also, if necessary, on the temperature.

It is also possible to define a lower limit value that unconditionally triggers the alert, typically 1.6 bar relative or 160,000 pascals, this being adopted by certain regulations. Finally, a leakage threshold may be defined, that is to say a pressure loss rate of the order of −40 pascals per second.

In this case, after an alert scan BA, the peripheral wheel unit P connects and transmits the alert AP and the detected new pressure value P1 back to the hub wheel unit C, the hub wheel unit C then transmitting the alert AP and the detected pressure value P1 to said at least one remote monitoring and/or control device UE, said at least one monitoring and/or control device UE receiving the alert AP, attesting to receiving the alert AP at the hub wheel unit C and acknowledging it in return for the hub wheel unit C.

The alert may be acknowledged by the peripheral wheel unit P at the origin thereof. In particular, it is this peripheral wheel unit P that is responsible for managing its alerts, in particular for discriminating new alerts from old ones. Typically, when the pressure conditions return to normal, for example after re-inflation, the peripheral wheel unit P broadcasts an update to the information to the hub wheel unit C and the alert AP is de facto canceled.

In particular, upon an alert AP transmitted during standstill of the motor vehicle, both for a pressure drop or for an electronic deficiency detected for a peripheral wheel unit P by itself, this alert being transmitted to the hub wheel unit C, the hub wheel unit C may transmit the alert AP and the detected pressure value P1, this being referenced AP+P1 in FIG. 3, or the deficiency alert to said at least one remote monitoring and/or control device UE at a sustained rate of the order of 4 seconds, the rate being greater than that of transmission from a wheel unit to said at least one remote monitoring and/or control device UE when no hub wheel unit C has been selected.

The peripheral wheel unit P and the hub wheel unit C respectively take the connection function in master mode CNXM and in slave mode CNXE. The peripheral wheel unit P sends pressure drop alert information AP and communicates the new pressure P1 of the tire of the wheel associated with the peripheral wheel unit P, which is referenced AP+P1 in FIG. 3.

The peripheral wheel unit P finally sends an end of connection request FCNX and the alert is deleted for the peripheral wheel unit P, this being referenced NAP for "no pressure alert". The peripheral wheel unit P that has not received a replacement request, previously referenced RC, in this FIG. 3 remains a peripheral wheel unit P and returns to standby V.

The hub wheel unit C develops an alert report ETrA intended for the peripheral wheel units P, for example by changing the value of the pressure P1 in the signaling frames Tr, and also intended for the remote monitoring and/or control device or devices UE with mention of the alert AP and of the new pressure of the tire P1 associated with the peripheral wheel unit P.

In one optional and non-limiting embodiment of the present invention, a peripheral wheel unit P may correspond directly to said at least one monitoring and/or control device UE in some real-life situations.

With reference to FIGS. 4 and 5, which show one of these real-life situations occurring when downloading data from the monitoring and/or control device UE, when said at least one monitoring and/or control device UE requests connection to a peripheral wheel unit P, said at least one monitoring and/or control device UE informs the hub wheel unit C, which sends the peripheral wheel unit P a frame Tr(RETrP) telling the peripheral wheel unit to prepare for direct connection to said at least one monitoring and/or control device UE.

The peripheral wheel unit P intercepts the frame Tr(RETrP), called preparation frame, at the next periodic scan B that the peripheral wheel unit P performs. After developing signaling frames confirming its preparation ETrP, the peripheral wheel unit P sends these signaling frames TrP to said at least one monitoring and/or control device UE or to the hub wheel unit C.

This is performed at a sustained rate of the order of 4 seconds, the rate being greater than a transmission rate from a wheel unit to said at least one remote monitoring and/or control device UE when no hub wheel unit C has been selected, that is to say for example in driving mode according to the prior art, so that the connection is established as quickly as possible after said at least one monitoring and/or control device UE has intercepted a preparation confirmation signaling frame ETrP sent by the peripheral wheel unit P during a scan B that this device performs.

However, as shown in FIG. 4, when no connection succeeds after a predetermined duration dutel, the peripheral wheel unit P returns to a standby state V.

On the other hand, as shown in FIG. 5, if the connection between the wheel unit or each peripheral wheel unit P and said at least one monitoring and/or control device UE is established, this connection lasts for as long as the monitoring and/or control device UE wants, the peripheral wheel unit P and said at least one monitoring and/or control device UE returning respectively to standby or to idle mode at the end of the connection.

It should be noted that this exchange between said at least one monitoring and/or control device UE and the peripheral wheel unit P may not just be unidirectional with the sending of data from the device to the peripheral wheel unit, such as for example during a download, but may also take place in the opposite direction or by being bidirectional, the peripheral wheel unit P being able to send data to said at least one monitoring and/or control device UE.

FIGS. 4 and 5 therefore show the preparation of a download of a plurality of data Dtel, which may or may not form a program, from one of the monitoring and/or control devices UE, the download being effective in FIG. 5 whereas it is not effective in FIG. 4.

A monitoring and/or control device UE leaves a state similar to the standby state V, being an idle operating state, and receives signaling frames Tr from the hub wheel unit C during a scan B performed by the device UE, these frames indicating the pressures of the tires P1 to P4 associated with the peripheral wheel units P without any other specific information.

On the other hand, the or one of the monitoring and/or control device(s) UE has data Dtel to be transmitted to the wheel units in memory, and the device sends, in the direction of the hub wheel unit C, a request RCNXUEC asking to prepare to connect the hub unit C to the device UE after receiving a signaling frame Tr(P1-P4). The hub wheel unit C, after receiving the request, puts itself in slave connection mode CNXE, while the or one of the monitoring and/or control device(s) UE puts itself in master connection mode CNXM. The hub wheel unit C may thus receive the data to be downloaded from the device UE.

Next, the hub wheel unit C sends signaling frames Tr in the direction of the peripheral wheel units P comprising, possibly in addition to the pressure values P1-P4, a request RETrP to prepare the peripheral wheel unit P for connection to the or one of the monitoring and/or control device(s) UE, which each peripheral wheel unit P intercepts during a periodic scan B, no pressure alert AP having otherwise been launched.

The preparation requests are transmitted on adjacent channels while the connection is established between the hub wheel unit C and the or one of the monitoring and/or control device(s) UE. The request to prepare for connection RETrP is transmitted in order to allow one or more of the peripheral wheel units P to be made available for a defined duration, resulting in regular transmission of preparation confirmation signaling frames by each peripheral wheel unit P, in order to allow possible connection of the monitoring and/or control device(s) UE.

After reception of the preparation request transmitted by the hub wheel unit C following a scan B performed by the peripheral wheel unit P, the unit or each peripheral wheel unit P develops, at ETrP, a preparation confirmation signaling frame TrP that the peripheral wheel unit P periodically sends to the hub unit C or the monitoring and/or control device UE responsible for the download, in FIG. 5 to the monitoring and/or control device UE.

One of the preparation confirmation signaling frames TrP is intercepted by the hub unit C or the device UE in a next scan B that the hub unit C or the device UE performs, in FIG. 5 the device UE.

In FIG. 4, no preparation confirmation signaling frame is sent by the peripheral wheel unit P. After a predetermined duration dutel has elapsed, the peripheral wheel unit P returns to standby V and the monitoring and/or control device UE returns to idle operation V. The download has not taken place.

In FIG. 5, it is the device UE that intercepts the preparation confirmation signaling frame from the peripheral wheel unit P in a scan B that it initiates, but this is not limiting and this could be, in another embodiment, the hub wheel unit C during one of its scans.

After reception of the preparation confirmation signaling frame TrP from the peripheral wheel unit P by the monitoring device UE or the hub wheel unit C, the monitoring device UE or the hub wheel unit C, in FIG. 5 the device UE, in master connection mode CNXM, sends a connection request RCNXUEP to the peripheral wheel unit P, which downloads the data transmitted by the or one of the monitoring and/or control device(s) UE in slave connection mode CNXE, this being shown by the reference TEL. As an alternative, the wheel unit or each peripheral wheel unit P downloads the data sequentially in slave connection mode, with the hub wheel unit C performing the role of broker during the download, this not being shown in FIG. 5.

A maximum download duration dutel, beyond which the download is interrupted, is predetermined for the connection of the monitoring and/or control device UE or of the hub wheel unit C to each peripheral wheel unit P. During the download, each peripheral wheel unit P may send signaling frames to the hub wheel unit C or the or one of the monitoring and/or control device(s) UE indicating the data download stage the peripheral wheel unit P is at.

At the end of the download TEL, the monitoring and/or control device(s) UE return to idle operation V, just as the peripheral wheel unit or units P involved in the download return to a standby mode V. During the download TEL, the peripheral wheel unit P may send one or more information frames regarding progress of the download TEL to the device UE.

When the hub wheel unit C serves as broker during the download, the hub wheel unit C receives a stop or end connection request from the monitoring and control device UE when all of the data Dtel have been downloaded by the hub wheel unit C.

The hub wheel unit C, in a frame development module ETr, develops download report frames Tr(P1-P4) in the direction of the monitoring and/or control device(s) UE in order to inform it or inform them of the completion or lack of completion of the data download Dtel for the hub wheel unit C, but also for all of the peripheral wheel units P when the hub wheel unit C served as a broker during the download. These frames Tr contain usual information about the pressure of the tires P1 to P4 and about the progress of the download TEL.

At the end, each peripheral wheel unit P is returned to standby V. The monitoring and/or control device UE involved in the download is also returned to idle operation or to standby V.

With reference to all of the figures, an aspect of the invention also relates to a system for communication between wheel units each associated with a wheel of a motor vehicle and between one of the wheel units, called hub wheel unit C, and said at least one device UE for remotely monitoring and/or controlling the wheel units. Each of the wheel units has at least means for measuring the pressure of a tire mounted on a rim, forming the wheel associated respectively with each wheel unit.

The communication system implements the communication method described above. The remote monitoring and/or control device(s) UE comprise means for identifying each wheel unit through respective identification parameters and means for communicating, to each wheel unit, its identification parameters and identification parameters of the other wheel units, each wheel unit comprising means for transmitting and receiving frames in accordance with a communication standard allowing a bidirectional data exchange. For example, each wheel unit comprises means for transmitting and receiving frames in accordance with a communication standard allowing a very short distance bidirectional data exchange using HF or UHF radio waves, such as for example the Bluetooth® communication standard.

The system comprises means for selecting one wheel unit from among the wheel units to be a hub wheel unit C storing the pressure values P1 to P4 measured and transmitted to the hub wheel unit C by each of the wheel units, the other wheel units of the motor vehicle being peripheral wheel units P.

The hub wheel unit C and the peripheral wheel units P comprise scanning means for detecting transmitted frames Tr. The scanning means of the peripheral wheel units P may be periodic B or triggered BA by an alert AP regarding the pressure of the tire of the wheel associated with a respective peripheral wheel unit P.

Each wheel unit comprises means for storing data relating to the pressure of the tires of the vehicle and means for developing signaling frames Tr intended for the other wheel units and said at least one monitoring and/or control device UE.

The remote monitoring and/or control device(s) UE is/are a central electronic unit for controlling the wheel units that is integrated in the motor vehicle and/or a mobile telephone provided with an application for communicating with the wheel units.

Each wheel unit comprises a time counter, either in order to perform a periodic scan or to determine a limit duration as hub wheel unit or to determine a maximum data download duration

The invention claimed is:

1. A method for communication between a plurality of electronic modules, called wheel units, with one another, on the one hand, and for communication between the plurality of wheel units and at least one device for remotely monitoring and/or controlling the wheel units, on the other hand, each of the wheel units being associated with a respective wheel of a motor vehicle, measuring, as parameter(s) associated with a wheel, at least one pressure value of a tire of the respective wheel, and transmitting the at least one pressure value to a hub wheel unit, each wheel unit being identified beforehand, and each wheel unit being able to identify other wheel units capable of communicating therewith, the communication between the plurality of electronic modules, and the communication between the plurality of wheel units and at least one device taking place in accordance with a communication standard allowing a bidirectional data exchange, the method comprising:
   selecting one wheel unit from among the wheel units at least temporarily to be the hub wheel unit, the hub wheel unit storing the at least one pressure value measured and transmitted to the hub wheel unit by each of the wheel units, the other wheel units among the wheel units not selected as the hub wheel unit being peripheral wheel units,
   periodically sending by the hub wheel unit at least one signaling frame in a direction of the peripheral wheel units, this signaling frame being received by a peripheral wheel unit of the peripheral wheel units when a scanning function is activated in the peripheral wheel unit receiving the signaling frame, said peripheral wheel unit receiving the signaling frame sending a return signal to the hub wheel unit when the hub wheel unit requests it or when the peripheral wheel unit receiving the signaling frame has information to transmit to the hub wheel unit,
   wherein the communication between the plurality of wheel units and said at least one device takes place:
      indirectly via the hub wheel unit when it is detected that the motor vehicle is at a standstill, and
      directly when it is detected that the motor vehicle is moving.

2. The method as claimed in claim 1, wherein the hub wheel unit is replaced by a peripheral wheel unit and becomes a peripheral wheel unit again according to a criteria, which are taken individually or in combination:
   an operating duration of a wheel unit as the hub wheel unit,
   a charge value of a battery of the hub wheel unit dropping below a predetermined value,
   a charge value of a battery of a peripheral wheel unit with highest charge value between batteries of the peripheral wheel units being higher than a charge value of the battery of the hub wheel unit by a predetermined ratio, said at least one remote monitoring and/or control device identifying that an operation of the hub wheel unit is deficient, or identifying criteria specific to the motor vehicle or to a road such comprising at least one of a stopping position of the vehicle influencing communication of the hub wheel unit, or, when the vehicle is at a standstill, or designation of a peripheral wheel unit to become the hub wheel unit for a duration of a stoppage.

3. The method as claimed in claim 2, wherein the hub wheel unit is replaced by a peripheral wheel unit as follows:

upon request from said at least one remote monitoring and/or control device, communicated to the hub wheel unit or at an instigation of the hub wheel unit, the hub wheel unit sending, in these two cases, a replacement request associated with said at least one signaling frame in the direction of the peripheral wheel units, a peripheral wheel unit receiving the replacement request when its scanning function is activated so as to receive said at least one signaling frame and the replacement request and responding to the hub wheel unit in this sense, or upon return request from a peripheral wheel unit sending a replacement return request frame to the hub wheel unit, after receiving said at least one signaling frame through scanning, with, in all cases, the hub wheel unit becomes an old hub wheel unit, goes into standby and is replaced by one of said peripheral wheel units that becomes a new hub wheel unit after the old hub wheel unit has communicated the stored at least one pressure value measured by each of the wheel units to the new hub wheel unit, the new hub wheel unit informing or not informing said at least one remote monitoring and/or control device of the change of the hub wheel unit.

4. The method as claimed in claim 1, wherein at least when the vehicle is at a standstill, the peripheral wheel units are on standby except for a scanning operation that is activated:

at predetermined periodic time intervals, when a tire pressure alert for the at least one pressure value lower than a predetermined minimum pressure value is detected, when a downward pressure variation of more than a predetermined value with respect to the at least one pressure value stored in the hub wheel unit for the tire associated with the peripheral wheel unit is detected or when a downward pressure variation rate of more than a predetermined value with respect to the at least one pressure value stored in the hub wheel unit for the tire associated with the peripheral wheel unit is detected, in which cases, after an alert scan, the peripheral wheel unit connects and transmits the alert and the at least one pressure value back to the hub wheel unit, the hub wheel unit then transmitting the alert and the at least one pressure value to said at least one remote monitoring and/or control device, said at least one monitoring and/or control device receiving the alert, attesting to the receipt of the alert at the hub wheel unit and acknowledging it in return for the hub wheel unit.

5. The method as claimed in claim 4, wherein when the alert is transmitted while the motor vehicle is at a standstill, the hub wheel unit transmits the alert and the at least one pressure value or a detected electronic deficiency to said at least one remote monitoring and/or control device at a sustained rate of 4 seconds, the rate being greater than a transmission rate from a wheel unit to said at least one remote monitoring and/or control device when the hub wheel unit has not been selected.

6. The method as claimed in claim 1, wherein scanning not activated at predetermined periodic time intervals is triggered by the peripheral wheel units if the peripheral wheel unit detects an internal electronic failure following a self-test operation that the peripheral wheel unit performs regularly on itself.

7. The method as claimed in claim 6, wherein when an alert is transmitted while the motor vehicle is at a standstill, the hub wheel unit transmits the alert and the at least one pressure value received from the peripheral wheel units or the detected internal electronic failure to said at least one remote monitoring and/or control device at a sustained rate of 4 seconds, the rate being greater than a transmission rate from a wheel unit to said at least one remote monitoring and/or control device when the hub wheel unit has not been selected.

8. The method as claimed in claim 1, wherein the hub wheel unit communicating with the peripheral wheel units is selected only when it is detected that the motor vehicle is at a standstill and continues for as long as the vehicle is at a standstill, the hub wheel unit and the peripheral wheel units becoming wheel units and communicating directly with said at least one monitoring and/or control device again as soon as the motor vehicle is moving.

9. The method as claimed in claim 1, wherein when said at least one monitoring and/or control device requests connection to at least one peripheral wheel unit of the peripheral wheel units, said at least one monitoring and/or control device informs the hub wheel unit, which sends, to said at least one peripheral wheel unit, a frame telling said at least one peripheral wheel unit to prepare for direct connection to said at least one monitoring and/or control device, said at least one peripheral wheel unit sending preparation confirmation signaling frames to said at least one monitoring and/or control device at a sustained rate of 4 seconds, the rate being greater than a transmission rate from a wheel unit to said at least one remote monitoring and/or control device when the hub wheel unit has not been selected and when, after a predetermined duration, no connection succeeds, said at least one peripheral wheel unit returns to a standby state.

10. The method as claimed in claim 1, wherein when said at least one monitoring and/or control device communicates data to be downloaded, forming or not forming a program, to the hub wheel unit, the hub wheel unit communicates said at least one frame in the direction of at least one peripheral wheel unit of the peripheral wheel units telling said at least one peripheral wheel unit to prepare for direct connection to said at least one monitoring and/or control device or to the hub wheel unit in order to sequentially send the data to be downloaded from said at least one monitoring and/or control device to each peripheral wheel unit directly or via the hub wheel unit in order to store the data to be downloaded in said at least one peripheral wheel unit, said at least one peripheral wheel unit sending preparation confirmation signaling frames back to said at least one monitoring and/or control device or to the hub wheel unit.

11. The method as claimed in claim 10, wherein said at least one peripheral wheel unit sequentially receives the data to be downloaded for a predetermined download duration, beyond which a download is interrupted, said at least one peripheral wheel unit then returning to standby and, if necessary, said at least one monitoring and/or control device returning to idle operation.

12. The method as claimed in claim 1, wherein the communication between a plurality of electronic modules, called wheel units, with one another, on the one hand, and between the plurality of wheel units and said at least one device for remotely monitoring and/or controlling the wheel units, on the other hand, takes place in accordance with a communication standard allowing a very short distance bidirectional data exchange using HF or UHF radio waves.

13. A system for communication between wheel units each associated with a wheel of a motor vehicle and between one of the wheel units, called a hub wheel unit, and at least one device for remotely monitoring and/or controlling the wheel units, each of the wheel units having at least means for measuring at least one pressure value of a tire mounted on a rim, forming the wheel respectively associated with the wheel unit and means for transmitting the at least one pressure value to the hub wheel unit, wherein said at least one remote monitoring and/or control device comprises:

means for identifying each wheel unit by way of respective identification parameters and means for communicating, to each wheel unit, its identification parameters and identification parameters of others of the wheel units, each wheel unit comprising means for transmitting and receiving frames in accordance with a communication standard allowing a bidirectional data exchange, means for selecting one wheel unit from among the wheel units to be the hub wheel unit, the hub wheel unit storing the at least one pressure value measured and transmitted to the hub wheel unit by each of the wheel units, the other wheel units of the motor vehicle among the wheel units not selected as the hub wheel unit being peripheral wheel units, the hub wheel unit and the peripheral wheel units comprising scanning means for detecting transmitted frames, each wheel unit comprising means for storing data relating to the pressure of the tires of the vehicle and means for developing signaling frames intended for the hub wheel unit and/or for said at least one monitoring and/or control device, the system configured to:

periodically send, by the hub wheel unit, at least one signaling frame in the direction of the peripheral wheel units, the signaling frame being received by a first peripheral wheel unit when a scanning function is activated in the first peripheral wheel unit, said first peripheral wheel unit sending a return signal to the hub wheel unit when the hub wheel unit requests it or when the first peripheral wheel unit has information to transmit to the hub wheel unit, perform communication between the wheel units and said at least one device for remotely monitoring and/or controlling the measured at least one pressure value of each of the wheels by:

performing indirect communication between the wheel units and said at least one monitoring and/or control device via the hub wheel unit when it is detected that the motor vehicle is at a standstill, and performing direct communication between the wheel units and said at least one monitoring and/or control device when it is detected that the motor vehicle is moving.

14. The system as claimed in claim 13, wherein each wheel unit comprises a transceiver for transmitting and receiving frames in accordance with a communication standard allowing a very short distance bidirectional data exchange using HF or UHF radio waves.

15. The system as claimed in claim 13, wherein said at least one remote monitoring and/or control device is a central electronic unit for controlling the wheel units that is integrated in the motor vehicle and/or a mobile telephone provided with an application for communicating with the wheel units.

* * * * *